United States Patent
Abe et al.

(10) Patent No.: US 10,024,644 B2
(45) Date of Patent: Jul. 17, 2018

(54) WIRE ELECTRICAL DISCHARGE MACHINE

(71) Applicant: FANUC Corporation, Yamanashi (JP)

(72) Inventors: Hiroyuki Abe, Yamanashi (JP); Kaoru Hiraga, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 201 days.

(21) Appl. No.: 15/203,833

(22) Filed: Jul. 7, 2016

(65) Prior Publication Data

US 2017/0010085 A1    Jan. 12, 2017

(30) Foreign Application Priority Data

Jul. 8, 2015 (JP) ................... 2015-136904

(51) Int. Cl.
*G01B 7/06* (2006.01)
*G01B 7/00* (2006.01)
(Continued)

(52) U.S. Cl.
CPC ............... *G01B 7/003* (2013.01); *B23H 7/02* (2013.01); *B23H 7/06* (2013.01); *B23H 7/26* (2013.01);
(Continued)

(58) Field of Classification Search
CPC . G01B 7/003; B23H 7/02; B23H 7/26; B23H 2500/20
(Continued)

(56) References Cited

U.S. PATENT DOCUMENTS 5,170,026 A * 12/1992 Suga ................. B23H 7/06
219/69.12
5,254,826 A * 10/1993 Kimura ............. B23H 7/065
219/69.12
(Continued)

FOREIGN PATENT DOCUMENTS

EP    0378278 A1    7/1990
EP    2495063 A2    9/2012
(Continued)

OTHER PUBLICATIONS

Extended European Search Report in EP Application No. 16177879.0, dated Sep. 27, 2016.
(Continued)

*Primary Examiner* — Christopher Fulton
(74) *Attorney, Agent, or Firm* — Hauptman Ham, LLP (57) ABSTRACT

A wire electrical discharge machine for detecting an end face of an object, configured so that when a contact detection movement is started and if contact between the wire electrode and the workpiece is detected, positions in which the contact between the wire electrode and the workpiece is detected are stored as contact detection positions and that when a non-contact detection movement is then started and if non-contact between the wire electrode and the workpiece is detected, positions in which the non-contact between the wire electrode and the workpiece is detected are stored as non-contact detection positions. When it is determined whether or not a set number of times of execution is reached and if the set number of times of execution is reached, a reference position is obtained by adding the radius of the wire electrode and a clearance of the wire guide to an end face determination position.

4 Claims, 12 Drawing Sheets

(51) Int. Cl.
*B23H 7/02* (2006.01)
*B23H 7/26* (2006.01)
*B23H 7/06* (2006.01)
*G01B 7/28* (2006.01)
*B23H 7/20* (2006.01)

(52) U.S. Cl.
CPC ............... *G01B 7/281* (2013.01); *B23H 7/20* (2013.01); *B23H 2500/20* (2013.01)

(58) Field of Classification Search
USPC .......................... 219/69.12, 69.17; 315/326
See application file for complete search history.

(56) References Cited

U.S. PATENT DOCUMENTS

| | | | |
|---|---|---|---|
| 5,410,117 A | 4/1995 | Reynier et al. | |
| 5,418,344 A * | 5/1995 | Magara | B23H 7/065 219/69.12 |
| 2002/0060528 A1 * | 5/2002 | Murai | B23H 7/04 315/291 |
| 2004/0030440 A1 | 2/2004 | Murai et al. | |
| 2012/0031879 A1 * | 2/2012 | Abe | B23H 7/065 219/69.12 |
| 2012/0223055 A1 | 9/2012 | Kawahara et al. | |
| 2013/0150999 A1 * | 6/2013 | Arakawa | B23H 7/065 700/162 |
| 2013/0277335 A1 * | 10/2013 | Matsunaga | B23H 1/02 219/69.12 |
| 2013/0325163 A1 * | 12/2013 | Katougi | B23H 7/18 700/162 |
| 2015/0051727 A1 * | 2/2015 | Hasegawa | B23H 7/06 700/162 |

FOREIGN PATENT DOCUMENTS

| | | |
|---|---|---|
| JP | 56-38332 B2 | 9/1981 |
| JP | 57-61420 A | 4/1982 |
| JP | 8-300225 A | 11/1996 |
| JP | 2000107945 A | 4/2000 |
| JP | 2004066393 A | 3/2004 |
| JP | 4017764 B2 | 12/2007 |

OTHER PUBLICATIONS

Decision to Grant a Patent in JP Application No. 2015-136904, dated Apr. 11, 2017.

* cited by examiner

FIG. 16

WIRE ELECTRICAL DISCHARGE MACHINE

RELATED APPLICATIONS

The present application claims priority to Japanese Patent Application Number 2015-136904, filed Jul. 8, 2015, the disclosure of which is hereby incorporated by reference herein in its entirety.

BACKGROUND OF THE INVENTION

Field of the Invention

The present invention relates to a wire electrical discharge machine configured to quickly accurately perform an end face detection operation (see FIG. 1) for obtaining a reference machining position of an object of positioning/measurement (a workpiece or a fixture or the like to replace it) or measuring the geometries by relatively moving a wire electrode and the object of positioning/measurement to achieve contact and non-contact.

Description of the Related Art

In general, in a wire electrical discharge machine, a wire electrode and an object of positioning/measurement are relatively moved to contact each other, in order to ascertain their relative positions, and a relative position as a reference for machining is settled based on their "contact position" (relative position of the wire electrode at the time of contact). The "object of measurement" is supposed to be a workpiece or a detection fixture for positioning or the like to replace it. In the following description in this specification, the "object of measurement" is represented by a "workpiece" as required. Further, the relative position as the reference for machining is simply called a "reference position", and this designation will also be used herein.

The "contact position" may be used directly as the reference position in some cases, or another relative position specifically related to the contact position may be used as the reference position in other cases. For example, the wire electrode may be passed through a round hole formed corresponding to a machining start region for the workpiece and relatively moved in three directions such that three positions of contact between the inner wall of the round hole and the wire electrode can be set and a center position of an circular arc that passes through the three points can be used as the reference position.

Thus, in order to accurately set the reference position based on the contact position between the wire electrode and the workpiece, the obtained contact position should naturally be accurate and reliable. In general, the contact position is detected in such a system that a detection voltage is applied between the wire electrode and the workpiece and the transition of the difference in the detection voltage corresponding to contact and/or non-contact is detected.

Figure 1:
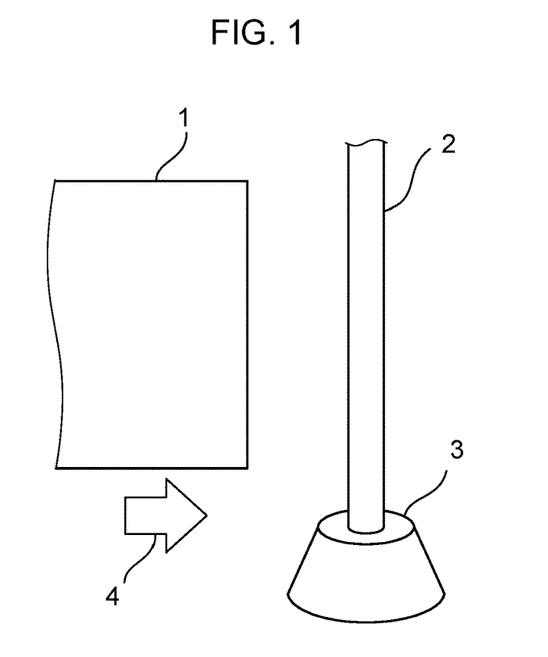
FIG. 1 is a diagram illustrating an operation for detecting an end face of a workpiece.

In settling the contact position between the wire electrode and the workpiece, a wire electrode 2 and a workpiece 1 are first kept in a definitely separate state (non-contact state), as shown in FIG. 1. The wire electrode and the workpiece in this non-contact state are relatively moved toward and brought into contact with each other with a voltage for contact detection applied between them (the workpiece 1 is moved toward the wire electrode 2 supported by a wire guide 3 as indicated by a movement 4 in FIG. 1). Conventionally, the relative position of the wire electrode at the point in time when the wire electrode and the workpiece are transferred from the non-contact state to a contact state is settled as the "contact position". The "time point of the transfer from the non-contact state to the contact state" is determined based on a change of the detection voltage applied between the two elements involved in the transfer from the non-contact state to the contact state.

However, the change of the detection voltage achieved when the non-contact state is actually transferred to the contact state is unstable and low in reproducibility. This is believed to be mainly attributable to the occurrence of an unstable state that involves displacement caused by vibration of the wire electrode or the like as the wire electrode transfers from the non-contact state to the contact state. Such displacement naturally destabilizes the contact state of the wire electrode and the workpiece.

A technique disclosed in Japanese Patent Application Laid-Open No. 2004-66393 is an example of countermeasures against this vibration. First, a wire electrode is relatively moved toward a workpiece from a distant position so that they are fully in contact. When the wire electrode and the workpiece are in full contact, they are hardly displaced by the vibration of the wire electrode, so that the contact state is very stable. In order to ensure the attainment of the full-contact state, the start of the contact is detected in accordance with an appropriate criterion, and a further approaching movement toward the workpiece is then added for a predetermined distance, for example. Subsequently, release from the full-contact state is detected as the wire electrode and the workpiece are moved away from each other, and a relative position in which the release is caused is detected and set as a position representative of the border of the contact or non-contact between the wire electrode and the workpiece.

According to Japanese Patent Application Laid-Open No. 2000-107945, moreover, an approaching movement for a segment time is repeated and continued so long as a non-contact state is determined for each sampling period during the approaching movement by forward drive of a motor. If a contact state is determined during the approaching movement, the motor is stopped at the end of the segment time and reversely driven to start a separating movement. The separating movement for the segment time is repeated and continued so long as the contact state is determined for each sampling period during the separating movement. If the non-contact state is determined during the separating movement, the motor is stopped at the end of the segment time and a contact detection operation is performed in such a manner that the approaching movement is started by forward drive. Coordinate values of points in time when the approaching and separating movements are stopped are stored. An average of a large number of stored coordinate values is calculated and calculated average coordinate values are set as the coordinate values of the machining reference position. Thus, contact or non-contact detection positions are individually acquired to allow delay in detection errors due to the moving speed to be canceled out by averaging, so that the moving speed need not be extremely reduced.

Figure 2:
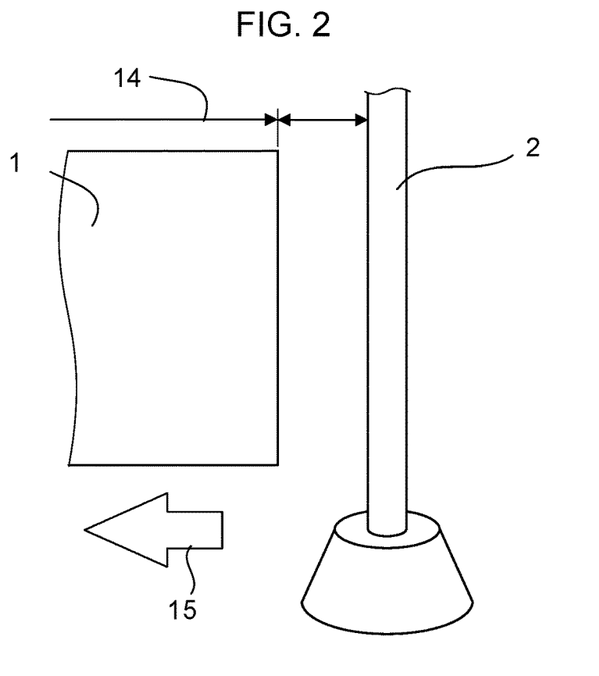
FIG. 2 is a diagram showing a non-contact detection position for a case where the moving speed of the workpiece is high.
Figure 16:
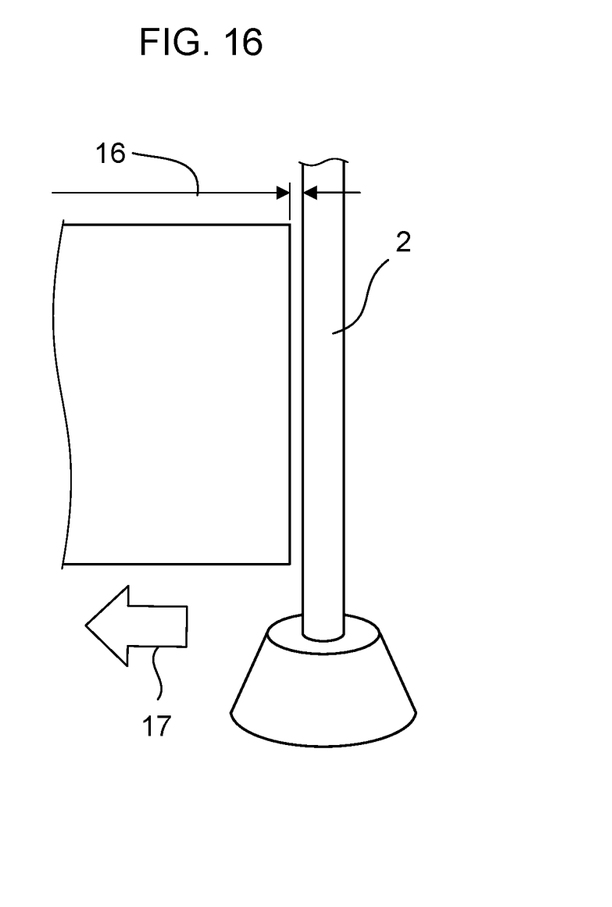
FIG. 16 is a diagram showing a non-contact detection position for a case where the moving speed of the workpiece is low.

In the case of the detection method disclosed in Japanese Patent Application Laid-Open No. 2004-66393, errors occur, though depending on the moving speed and the sampling period. If the speed of a movement (non-contact detection movement 15) of the workpiece 1 away from the wire electrode 2 is high, as shown in FIG. 2, errors in the non-contact detection position increase as indicated by a non-contact detection position (large error) 14. In order to reduce this error, the moving speed should be extremely reduced, as shown in FIG. 16. By reducing the speed of a non-contact detection movement 17, the errors in the non-contact detection position can be reduced as indicated by a non-contact detection position (small error) 16. While the errors can be reduced, the time for an end face detection operation is extended. Thus, in the case of the detection method disclosed in Japanese Patent Application Laid-Open No. 2004-66393, errors are liable to occur due to delay in detection or the like, so that the moving speed should be extremely reduced, and therefore, there is a problem that the time for the end face detection operation is extended. In the case of the detection method disclosed in Japanese Patent Application Laid-Open No. 2000-107945, moreover, an influence remains on the displacement caused by the vibration of the wire electrode or the like.

Figure 3:
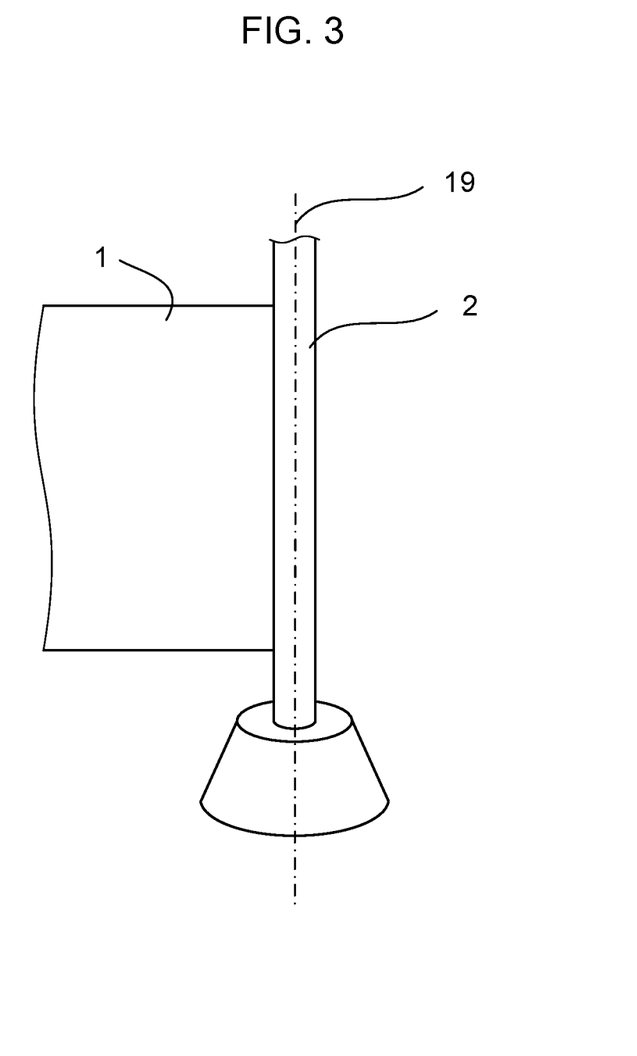
FIG. 3 is a diagram showing a theoretical end face detection completion position of the workpiece.

An ideal contact position between the wire electrode 2 and the workpiece 1 is such that a center 19 of the wire electrode 2 is located corresponding to the radius of the wire electrode as compared with an end face of the workpiece 1 (see FIG. 3). If the wire electrode 2 is displaced due to a factor such as its vibration or deflection or the difference (clearance) between the diameter of the wire electrode and the inner diameter of the wire guide, the center 19 of the wire electrode is located corresponding to the radius of the wire electrode plus a displacement amount as compared with the end face of the workpiece 1. Thus, there is a problem that an error (displacement amount) is caused by the vibration or deflection of the wire electrode or the difference between the diameter of the wire electrode and the inner diameter of the wire guide, so that an accurate reference position cannot be obtained.

SUMMARY OF THE INVENTION

Accordingly, in view of the above-described problems of the prior art, the object of the present invention is to provide a wire electrical discharge machine capable of obtaining a reference position more quickly and accurately.

A wire electrical discharge machine according to the present invention, which has functions of relatively moving an object and a wire electrode supported by upper and lower wire guides and positioning the wire electrode or measuring the shape of the object based on a contact/non-contact state of the wire electrode and the object, comprises a voltage applying unit configured to apply a detection voltage for detecting the contact/non-contact state of the wire electrode and the object between the wire electrode and the object, a relative movement unit for relatively moving the wire electrode and the object, a wire electrode position detecting unit for detecting a center position of the wire electrode, a contact state detecting unit configured to detect the voltage between the wire electrode and the object in the course of relative movement of the wire electrode toward and away from the object by the relative movement unit and detect the contact/non-contact state of the wire electrode and the object based on the detected voltage, a wire electrode diameter storage unit for storing the diameter of the wire electrode, a wire electrode displacement amount storage unit for storing an amount of displacement such that the wire electrode is displaceable between the upper and lower wire guides in a direction perpendicular to a line segment connecting the upper and lower wire guides, an end face determination position detecting unit configured to detect an end face determination position in which the wire electrode is determined to be in contact with an end face of the object, based on the contact/non-contact state detected by the contact state detecting unit and the position of the wire electrode detected by the wire electrode position detecting unit, and an end face determination position compensation unit configured to obtain a position by compensation of the end face determination position based on a compensation value obtained from the wire electrode diameter and the displacement amount. The wire electrical discharge machine positions the wire electrode or measures the shape of the object based on the position obtained by the end face determination position compensation unit as a position of the object.

The contact state detecting unit is a unit for detecting a point in time when the wire electrode and the object make transition from non-contact to contact in the course of the relative approaching movement and/or a point in time when the wire electrode and the object make transition from contact to non-contact in the course of the relative separating movement.

Further, the wire electrode displacement amount is a clearance of the wire guides, an amplitude of the wire electrode, or an amount of deflection of the wire electrode.

According to the present invention, there can be provided a wire electrical discharge machine capable of obtaining a reference position more quickly and accurately.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

Figure 4:
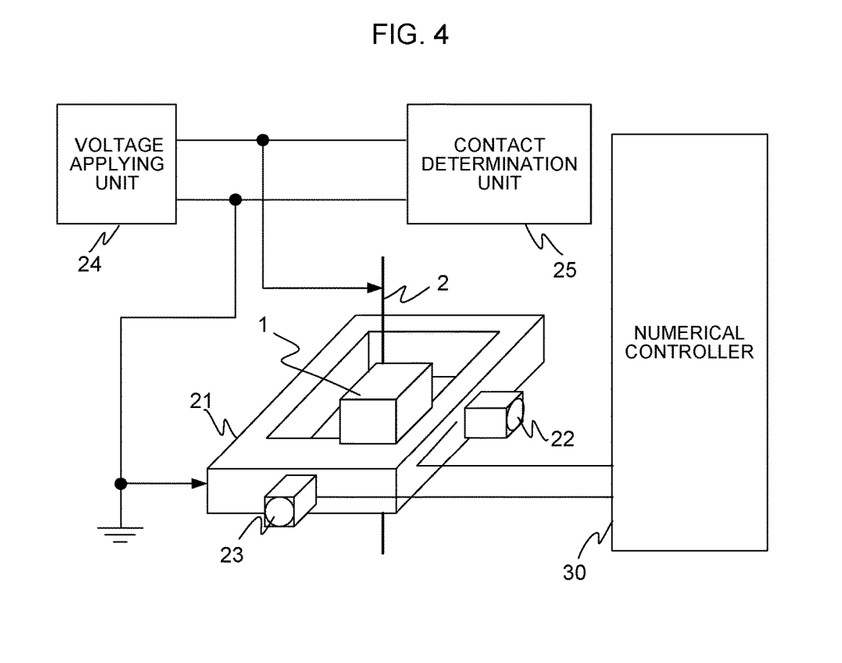
FIG. 4 is a diagram illustrating a schematic configuration of a wire electrical discharge machine controlled by a controller.

Embodiments of the present invention will now be described with reference to the accompanying drawings;

FIG. 4 is a diagram illustrating a schematic configuration of a wire electrical discharge machine controlled by a controller. Numeral 21 denotes an XY-table (worktable two-dimensionally controlled by two axes of an X-axis motor 22 and a Y-axis motor 23), and an object is placed on the XY-table 21. The object may be an electrically conductive workpiece 1 or a positioning fixture that replaces it. Numeral 2 denotes a wire electrode 2 used for machining. A voltage applying unit 24 is configured to apply a detection voltage or machining voltage between the wire electrode 2 and the XY-table 21. Since the XY-table 21 and the workpiece 1 are electrically connected to each other, the detection voltage or machining voltage is applied to the wire electrode 2 and the workpiece 1.

The detection voltage applied by the voltage applying unit 24 is a voltage that is applied in order to detect contact and non-contact states and is not a voltage that causes electrical discharge. When the wire electrode 2 and the workpiece 1 contact each other, conduction occurs and the actually applied voltage fluctuates. A contact determination unit 25 monitors this fluctuation and determines the contact state in a mode described later.

The machining voltage is a high voltage applied when the workpiece 1 is actually machined. The workpiece 1 is subjected to wire electrical discharge by applying the machining voltage as the XY-table 21 is moved in a horizontal direction (hereinafter referred to as "±X-direction") as illustrated and a depth direction (hereinafter referred to as "±Y-direction") perpendicular thereto according to a machining program or the like.

Figure 5:
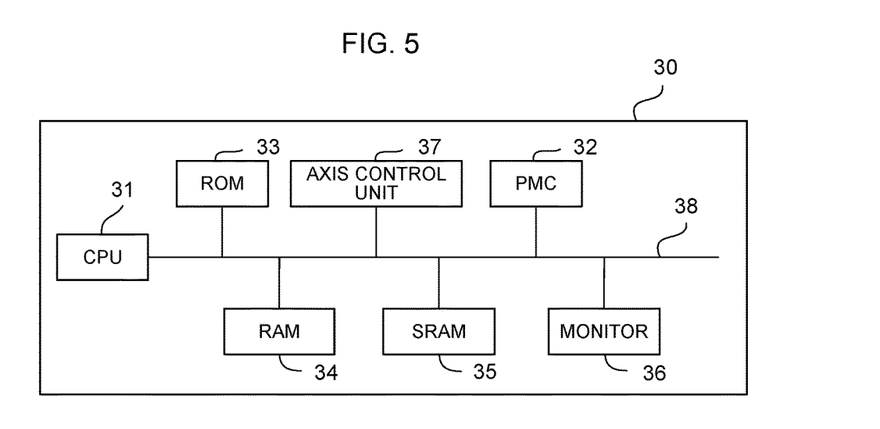
FIG. 5 is a block diagram illustrating a schematic configuration of the controller for controlling the wire electrical discharge machine.

FIG. 5 is a block diagram illustrating a schematic configuration of the controller for controlling the wire electrical discharge machine. A numerical controller 30 of the wire electrical discharge machine comprises a CPU 31 for controlling the entire system, a PMC (programmable machine controller) 32, memories such as a ROM 33, RAM 34, and SRAM 35 for storing data, such as data in the machining program and various parameters, an axis control unit 37 for controlling motors in mechanical sections of a monitor 36 for various display items, and the like. The memories, such as the nonvolatile SRAM 35, are stored with a wire electrode diameter and a wire electrode displacement amount (clearance due to the difference between the diameter of the wire electrode and the inner diameter of a wire guide, amplitude of the wire electrode, or amount of deflection of the wire electrode).

The numerical controller 30 drives the XY-table 21 with the workpiece 1 thereon within an XY-plane to control the movement of the workpiece 1 toward and away from the wire electrode 2. Also, the voltage applying unit 24 is made to perform control to apply the detection voltage between the wire electrode 2 and the workpiece 1, and the contact determination unit 25 for detecting the detection voltage between wire electrode 2 and the workpiece 1 is made to control to detect contact or non-contact between the wire electrode 2 and the workpiece 1.

In performing machining of the workpiece 1 by means of the wire electrical discharge machine, it is generally necessary to determine a so-called (machining) reference position. The following is a description of a method for detecting an end face of the workpiece 1 (end face detection processing of the present invention) in order to determine the reference position.

The wire electrode and the workpiece are first kept in a definitely separate state (non-contact state) and then brought to such a state that a voltage for contact detection is applied between them.

(1) The wire electrode and the workpiece are relatively moved so that contact detection is achieved.
(2) The relative movement is stopped when the contact detection is achieved.
(3) The wire electrode and the workpiece in the contact state are relatively moved so that non-contact detection is achieved.
(4) The relative movement is stopped when the non-contact detection is achieved.
(5) The operations (1) to (4) are performed a set number of times.
(6) An end face determination position is obtained by averaging a plurality of detection positions.
(7) The reference position is obtained by compensating the end face determination position in (6) with "radius of the wire electrode" and "clearance of the wire guide" as compensation values.

The following is a description of a way of obtaining the end face determination position, that is, a method for detecting the state of contact between the wire electrode and the workpiece. To "detect the state of contact" according to the present invention is to obtain the end face determination position by detecting how the wire electrode and the workpiece are transferred from the non-contact state to the contact state, to obtain the end face determination position by detecting how the wire electrode and the workpiece are transferred from the contact state to the non-contact state, or to obtain the end face determination position by both these measures.

The following is a description of three embodiments of the present invention. In any of these embodiments, the difference (clearance) between the diameter of the wire electrode and the inner diameter of the wire guide is given as the cause of detection errors.

Embodiment 1

Figure 6:
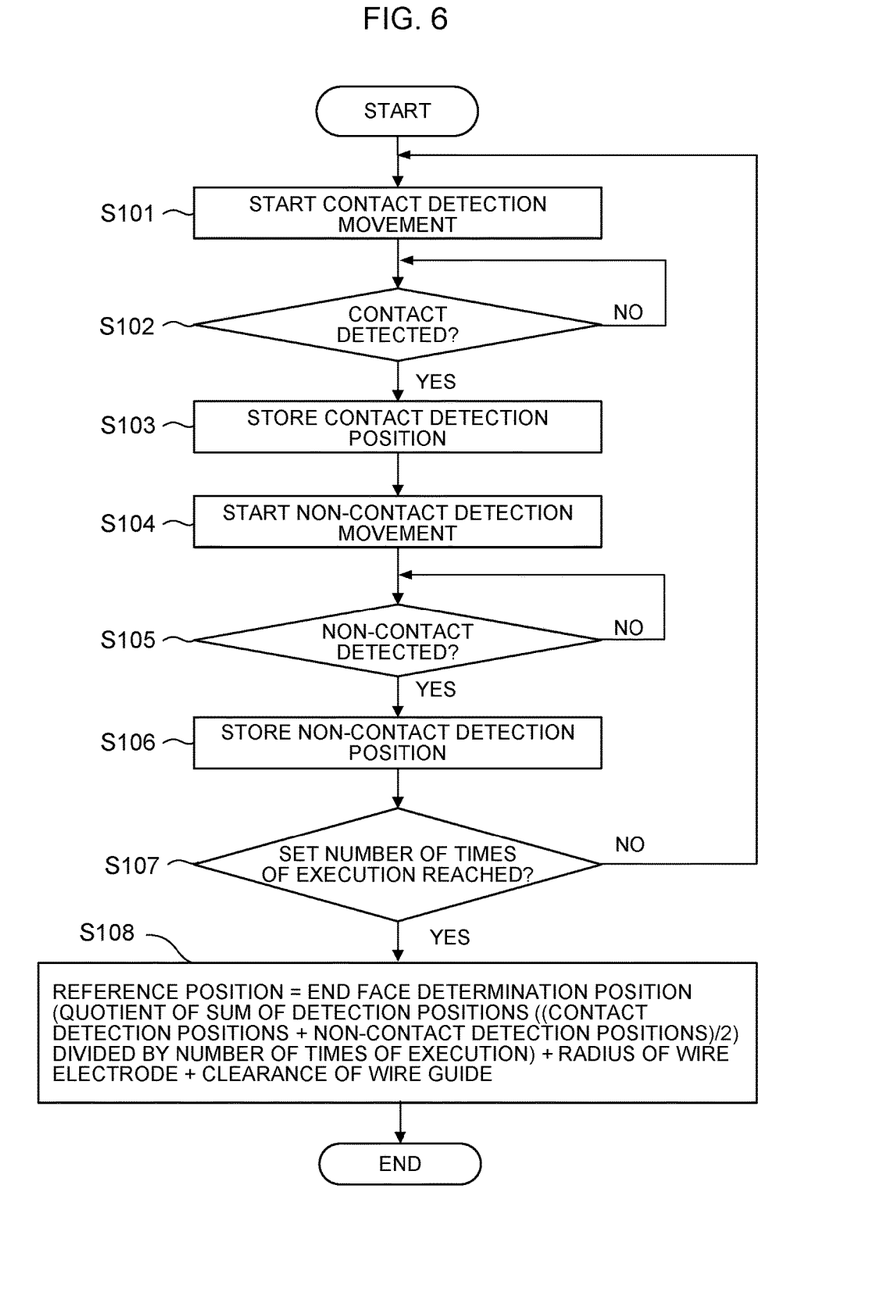
FIG. 6 is a flowchart showing end face detection processing for a workpiece according to Embodiment 1.

The flowchart of FIG. 6 shows processing for a case where a position obtained by averaging positions contact-detected in (2) and positions non-contact-detected in (4) is used as a detection position. The following is a sequential description of various steps of operation.

[Step S101] A contact detection movement is started. The workpiece and the wire electrode are relatively moved.

[Step S102] It is determined whether or not contact between the wire electrode and the workpiece is detected. If the contact is detected, the processing proceeds to Step S103. If not, detection of the contact is awaited.

[Step S103] Positions in which the contact between the wire electrode and the workpiece is detected in Step S102 are stored as contact detection positions.

[Step S104] A non-contact detection movement is started.

[Step S105] It is determined whether or not non-contact between the wire electrode and the workpiece is detected. If the non-contact is detected, the processing proceeds to Step S106. If not, detection of the non-contact is awaited.

[Step S106] Positions in which the non-contact between the wire electrode and the workpiece is detected in Step S105 are stored as non-contact detection positions.

[Step S107] It is determined whether or not a set number of times of execution is reached. If the set number of times of execution is reached, the processing proceeds to Step S108. If not, the processing returns to Step S101, whereupon the processing is continued.

[Step S108] The reference position is obtained by adding the radius of the wire electrode and the clearance of the wire guide to the end face determination position (quotient of the sum of a plurality of detection positions ((contact detection positions+non-contact detection positions)/2) divided by the number of times of execution), whereupon the processing ends.

Figure 7:
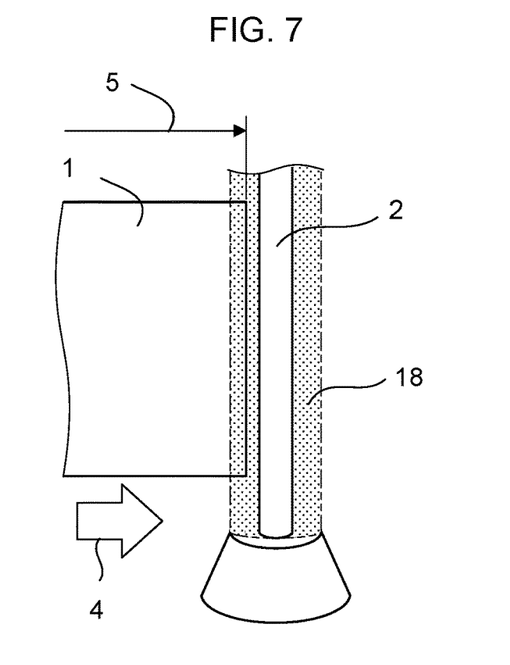
FIG. 7 is a diagram showing a contact detection position for an end face of the workpiece according to Embodiment 1.
Figure 8:
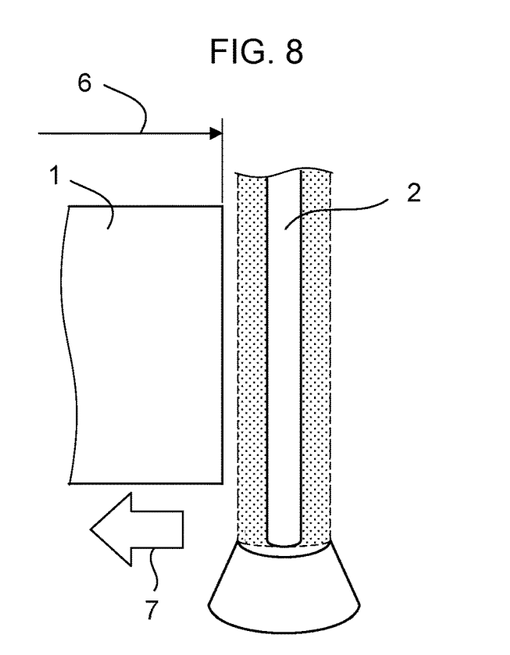
FIG. 8 is a diagram showing a non-contact detection position for the end face of the workpiece according to Embodiment 1.

As described in connection with Japanese Patent Application Laid-Open No. 2004-66393, the detection positions based on the contact detection and the non-contact detection are delayed due to various factors. In the contact detection, a position in which the wire electrode 2 slightly bites the workpiece 1 is recognized as a contact detection position 5 (see FIG. 7). A displacement region 18 is a region in which the wire electrode 2 is displaceable due to its vibration or deflection or the clearance of the wire guide. In the non-contact detection, the workpiece 1 is urged for a non-contact detection movement 7, and a position in which the wire electrode 2 is slightly separated from the workpiece 1 is recognized as a non-contact detection position 6 (see FIG. 8). If either of these positions is determined to be the end face determination position, therefore, the moving speed should be extremely reduced in order to lessen the aforementioned errors in detections due to delay, so that the time for an end face detection operation is extended.

Figure 9:
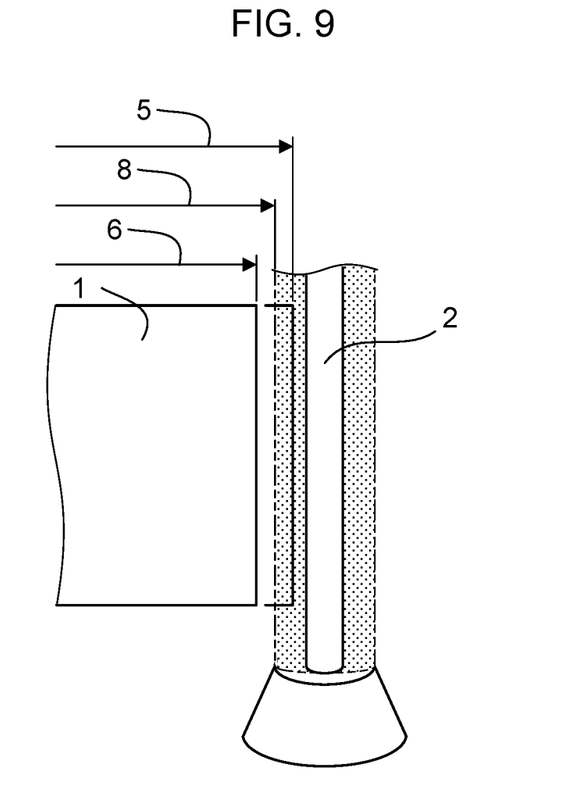
FIG. 9 is a diagram showing an end face determination position for the end face of the workpiece according to Embodiment 1.

In Embodiment 1, the contact detection and the non-contact detection are performed by the set number of times of execution without reducing the moving speed at the time of detection. When this is done, the moving speeds at the times of the contact detection and the non-contact detection are supposed to be equal. The detection positions are subject to errors. Since both the contact and non-contact detection positions are used and the moving speeds at the detection times are equal, however, the errors can be canceled out by averaging. A position obtained by averaging a plurality of contact detection positions 5 and non-contact detection positions 6 is supposed to be an end face determination position 8 (see FIG. 9). The end face determination position 8 is obtained according to equation (1) as follows:

$$\text{End face determination position} = \{\text{sum of detection positions} \\ ((\text{contact detection postions} + \text{non-contact detection postions})/ \\ 2)\}/(\text{number of times of execution}). \quad (1)$$

Embodiment 2

Figure 10:
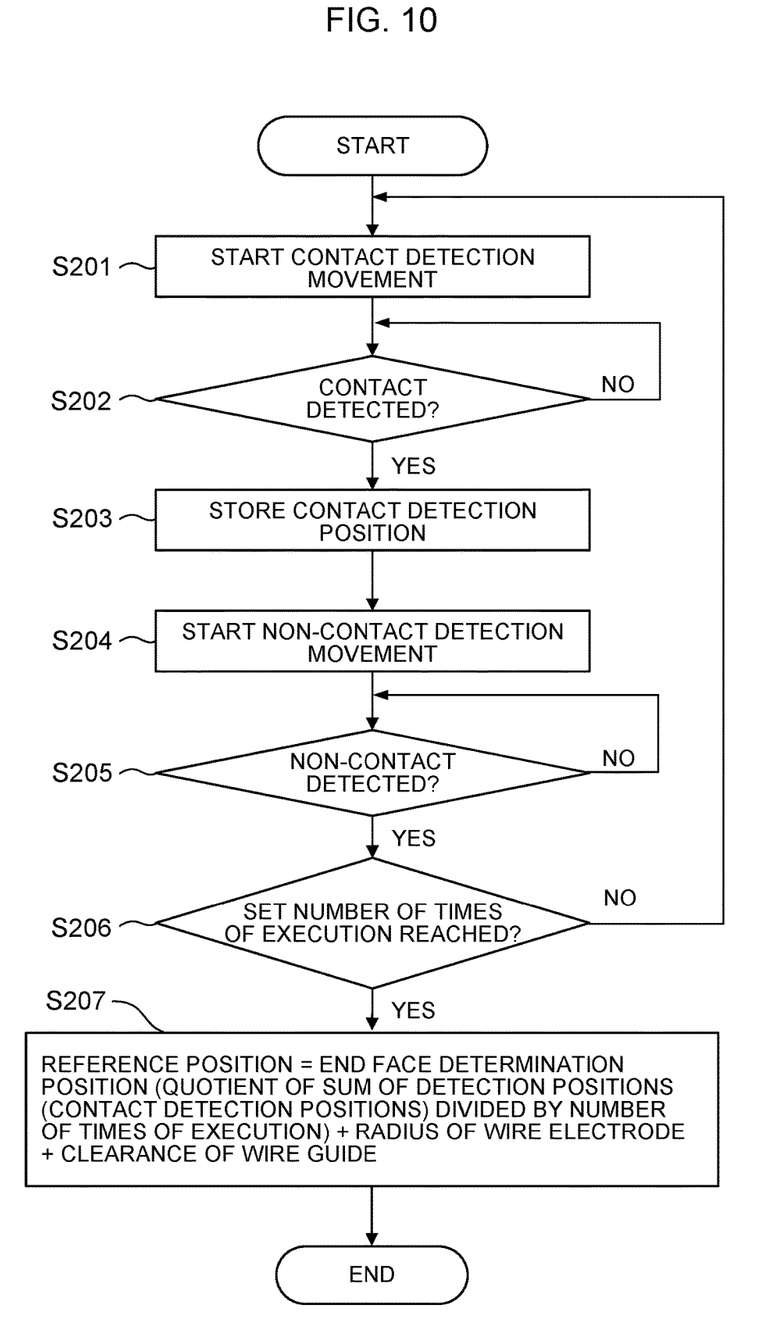
FIG. 10 is a flowchart showing end face detection processing for a workpiece according to Embodiment 2.

The flowchart of FIG. 10 shows processing for a case where the positions contact-detected in (2) are used as detection positions. The following is a sequential description of various steps of operation.

[Step S201] A contact detection movement is started. The workpiece and the wire electrode are relatively moved.

[Step S202] It is determined whether or not contact between the wire electrode and the workpiece is detected. If the contact is detected, the processing proceeds to Step S203. If not, detection of the contact is awaited.

[Step S203] Positions in which the contact between the wire electrode and the workpiece is detected in Step S202 are stored as contact detection positions.

[Step S204] A non-contact detection movement is started.

[Step S205] It is determined whether or not non-contact between the wire electrode and the workpiece is detected. If the non-contact is detected, the processing proceeds to Step S206. If not, detection of the non-contact is awaited.

[Step S206] It is determined whether or not a set number of times of execution is reached. If the set number of times of execution is reached, the processing proceeds to Step S207. If not, the processing returns to Step S201, whereupon the processing is continued.

[Step S207] The reference position is obtained by adding the radius of the wire electrode and the clearance of the wire guide to the end face determination position (quotient of the sum of a plurality of detection positions (contact detection positions) divided by the number of times of execution), whereupon the processing ends.

In order to lessen the errors in detection positions due to detection delay, as described above, the moving speed of (1) should be extremely reduced. For the movement of (3) in which no detection positions are obtained, however, the time for end face determination can be reduced by increasing the moving speed. Alternatively, if a distance for the non-contact state is somewhat predictable, the movement of (3) may be rapidly made for a predetermined distance in a non-contact direction (see FIG. 11). The following is a sequential description of various steps of operation.

Figure 11:
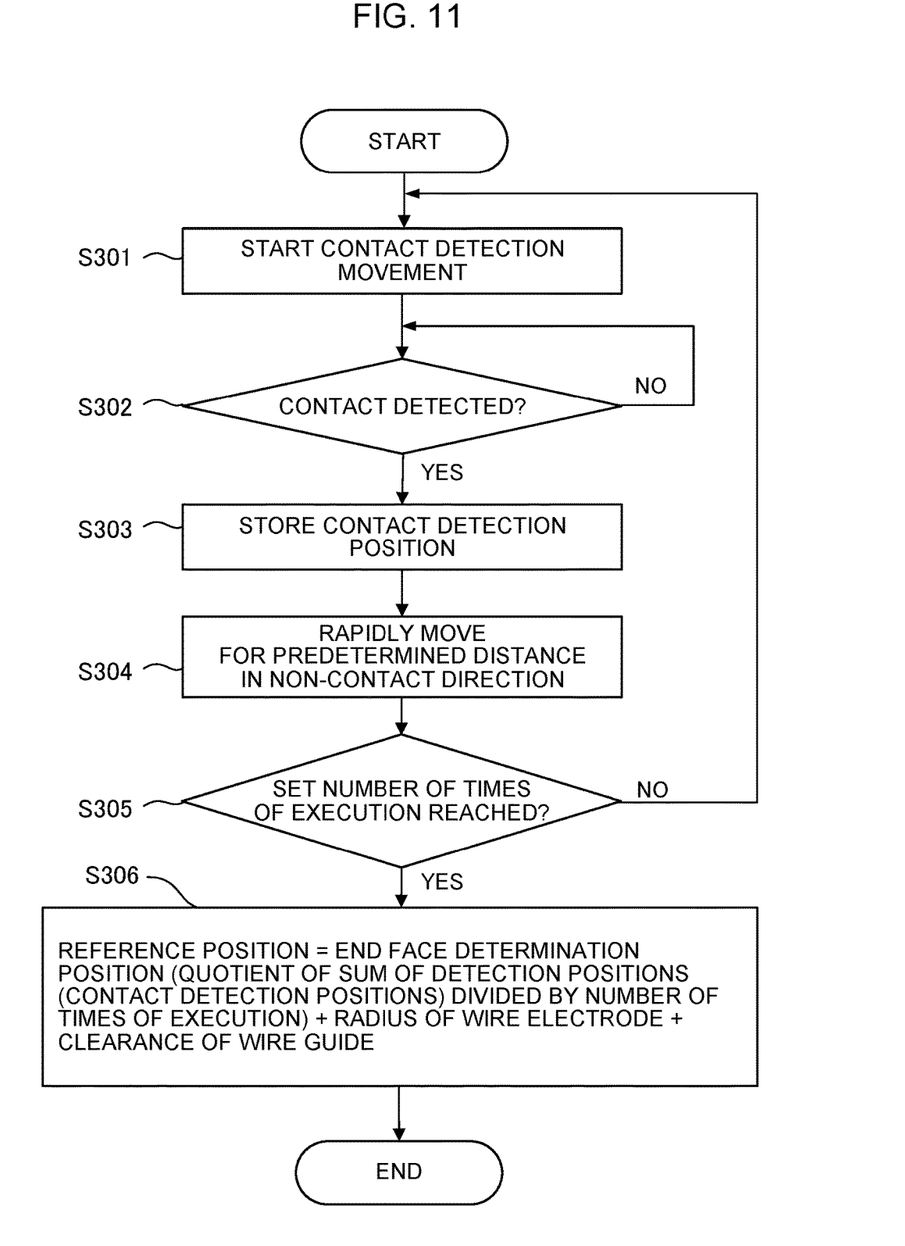
FIG. 11 is a flowchart showing (another example of) the end face detection processing for the workpiece according to Embodiment 2.

[Step S301] A contact detection movement is started. The workpiece and the wire electrode are relatively moved.

[Step S302] It is determined whether or not contact between the wire electrode and the workpiece is detected. If the contact is detected, the processing proceeds to Step S303. If not, detection of the contact is awaited.

[Step S303] Positions in which the contact between the wire electrode and the workpiece is detected in Step S302 are stored as contact detection positions.

[Step S304] A non-contact detection movement is started.

[Step S305] It is determined whether or not a set number of times of execution is reached. If the set number of times of execution is reached, the processing proceeds to Step S306. If not, the processing returns to Step S301, whereupon the processing is continued.

[Step S306] The reference position is obtained by adding the radius of the wire electrode and the clearance of the wire guide to the end face determination position (quotient of the sum of a plurality of detection positions (contact detection positions) divided by the number of times of execution), whereupon the processing ends.

The end face determination position is obtained according to equation (2) as follows:

$$\text{End face determination position} = \\ (\text{sum of detection postitions (contact detection postions}))/ \\ (\text{number of times of execution}). \quad (2)$$

Embodiment 3

Figure 12:
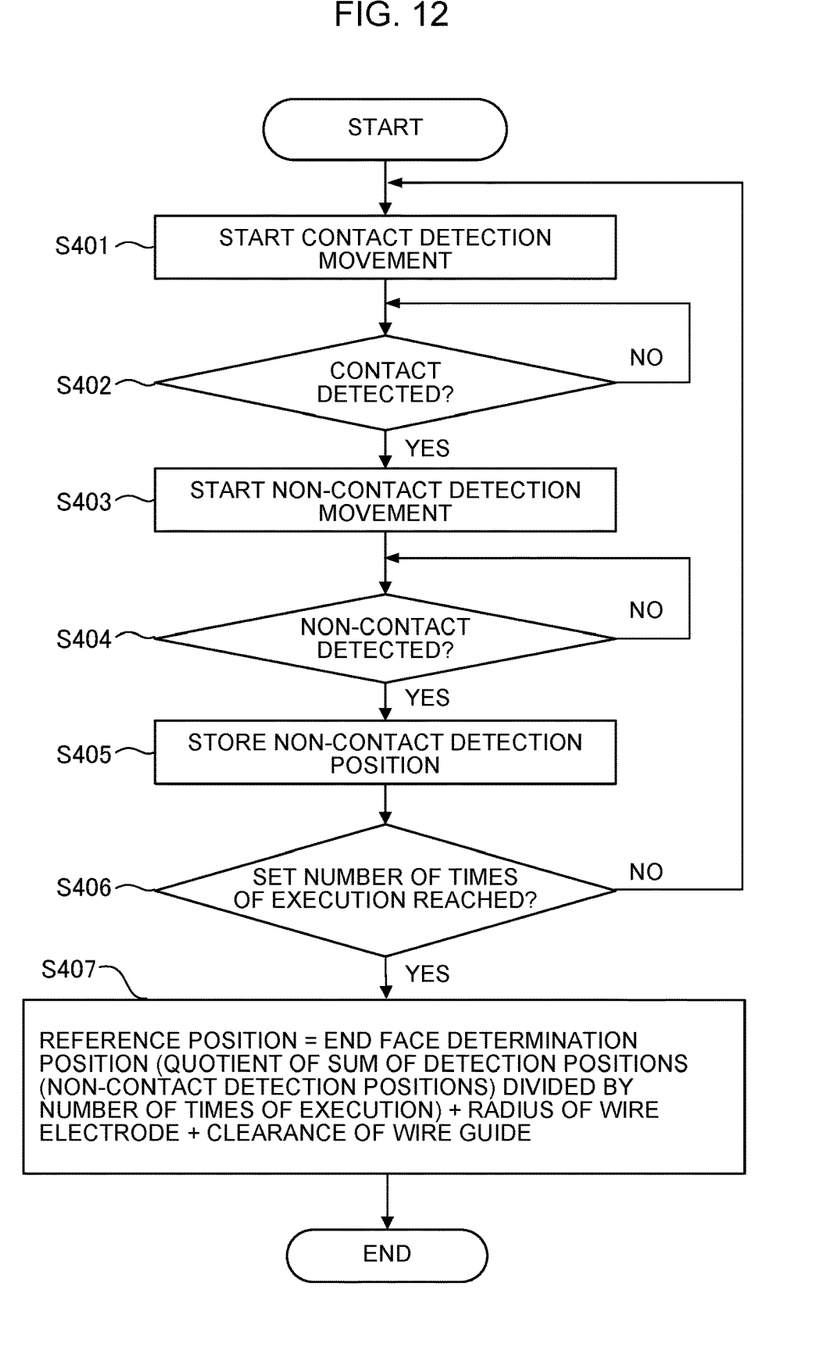
FIG. 12 is a flowchart showing end face detection processing for a workpiece according to Embodiment 3.

The flowchart of FIG. 12 shows processing for a case where the positions non-contact-detected in (4) are used as detection positions. The following is a sequential description of various steps of operation.

[Step S401] A contact detection movement is started. The workpiece and the wire electrode are relatively moved.

[Step S402] It is determined whether or not contact between the wire electrode and the workpiece is detected. If the contact is detected, the processing proceeds to Step S403. If not, detection of the contact is awaited.

[Step S403] A non-contact detection movement is started.

[Step S404] It is determined whether or not non-contact between the wire electrode and the workpiece is detected. If the non-contact is detected, the processing proceeds to Step S405. If not, detection of the non-contact is awaited.

[Step S405] The non-contact detection position detected in Step S404 is stored.

[Step S406] It is determined whether or not a set number of times of execution is reached. If the set number of times of execution is reached, the processing proceeds to Step S407. If not, the processing returns to Step S401, whereupon the processing is continued.

[Step S407] The reference position is obtained by adding the radius of the wire electrode and the clearance of the wire guide to the end face determination position (quotient of the sum of a plurality of detection positions (non-contact detection positions) divided by the number of times of execution), whereupon the processing ends.

In order to lessen the errors in detection positions due to delay, as described above, the moving speed of (3) should be extremely reduced. For the movement of (1) in which no detection positions are obtained, however, the time for end face determination can be reduced by increasing the moving speed. Alternatively, if a distance for the contact state is somewhat predictable, the movement of (1) may be rapidly made for a predetermined distance in a contact direction (see FIG. 13). The following is a sequential description of various steps of operation.

Figure 13:
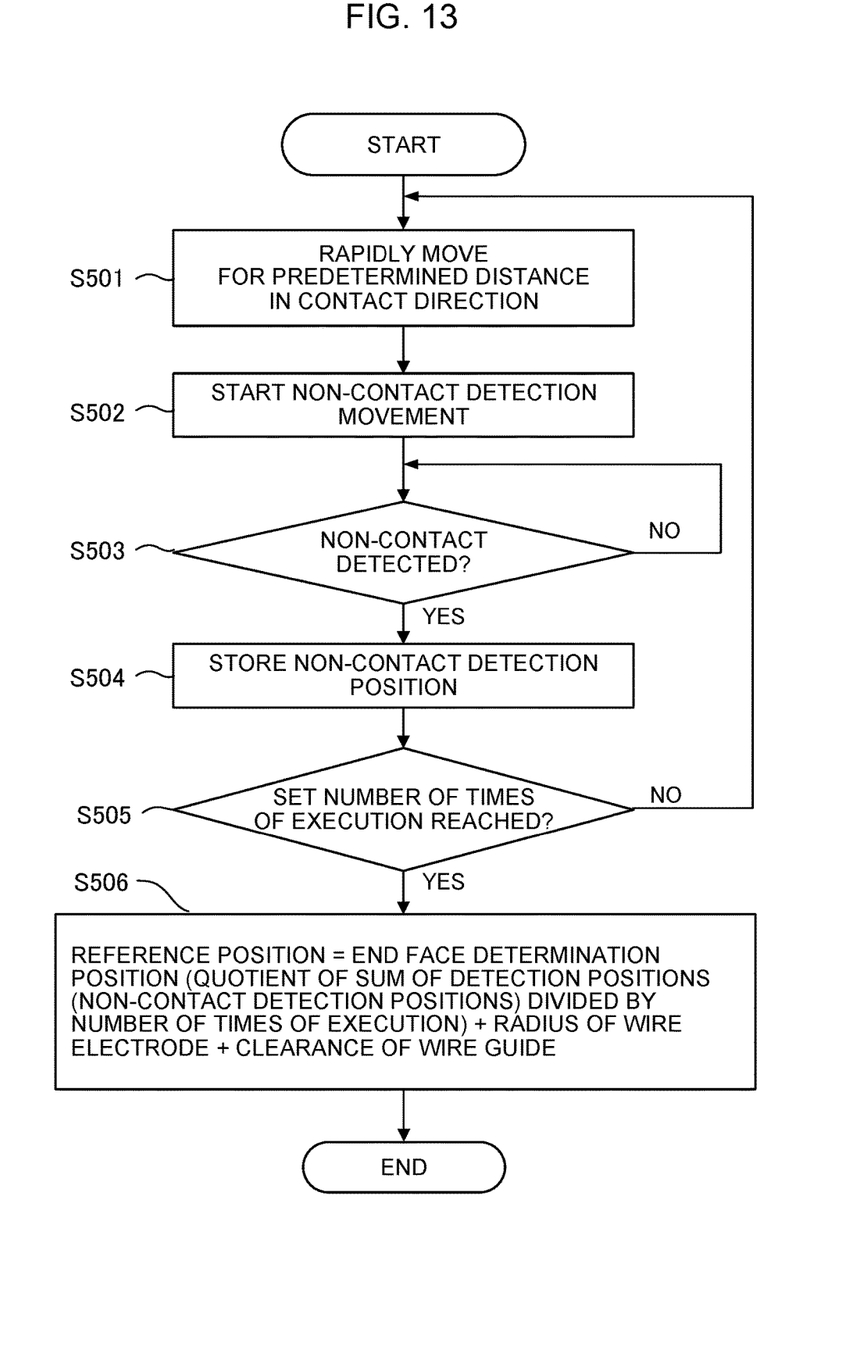
FIG. 13 is a flowchart showing (another example of) the end face detection processing for the workpiece according to Embodiment 3.

[Step S501] The workpiece and the wire electrode are relatively moved for a predetermined distance in a direction in which they come into contact with each other.

[Step S502] A non-contact detection movement is started.

[Step S503] It is determined whether or not non-contact between the wire electrode and the workpiece is detected. If the non-contact is detected, the processing proceeds to Step S504. If not, detection of the non-contact is awaited.

[Step S504] The non-contact detection position detected in Step S503 is stored.

[Step S505] It is determined whether or not a set number of times of execution is reached. If the set number of times of execution is reached, the processing proceeds to Step S506. If not, the processing returns to Step S501, whereupon the processing is continued.

[Step S506] The reference position is obtained by adding the radius of the wire electrode and the clearance of the wire guide to the end face determination position (quotient of the sum of a plurality of detection positions (non-contact detection positions) divided by the number of times of execution), whereupon the processing ends.

The end face determination position is obtained according to equation (3) as follows:

$$\text{End face determination position} = \text{(sum of detection postitions (non-contact detection postions))} / \text{(number of times of execution)}. \tag{3}$$

Figure 14:
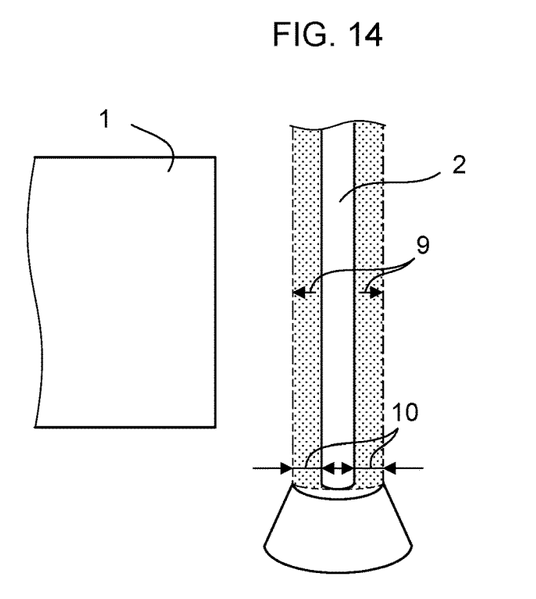
FIG. 14 is a diagram showing vibration of a wire electrode.

The following is a supplementary description of a way of obtaining the reference position. Normally, a diced guide having a gap of about 1 to 20 μm relative to the outer diameter of the wire electrode 2 is used for a wire guide 3 that supports the wire electrode 2. If the wire electrode 2 is run through a pair of wire guides 3 that are arranged substantially at right angles to a reference plane, therefore, it moves within the range of gaps between itself and the wire guides 3 (gaps 10 of the wire guides), as indicated by movements (displacements) 9 (see FIG. 14). This is considered to be the main cause of the displacement of the wire electrode 2.

Figure 15:
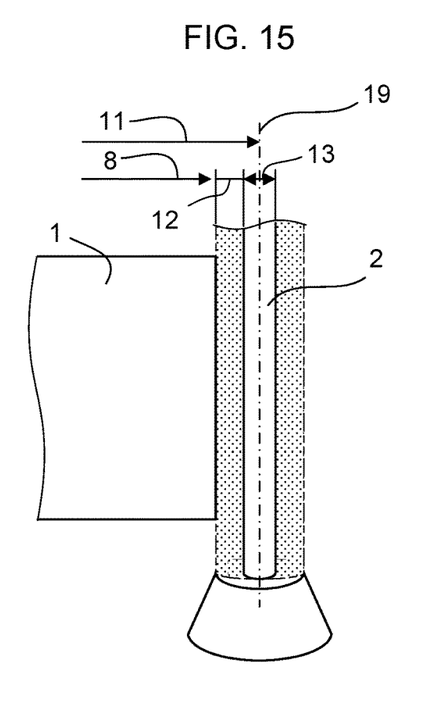
FIG. 15 is a diagram showing a reference position of the wire electrode.

Since the amount of the above-described displacement amount can be replaced with a clearance 12 of the wire guide, therefore, an accurate reference position 11 can be obtained by compensation based on the clearance after the end face determination position is obtained (FIG. 15). The reference position 11 is obtained according to equation (4) as follows. The diameter of the wire electrode 2 is given by a wire electrode diameter 13.

$$\text{Reference position} = \text{end face determination position} + \text{wire electrode radius} + \text{wire guide clearance}. \tag{4}$$

In connection with the foregoing embodiments of the present invention, the displacement amount of the wire electrode 2 is described as the clearance of the wire guide 3. If the wire electrode 2 vibrates, however, its amplitude may be regarded as the displacement amount. While the wire electrode is known to be deflected under the influence of a machining fluid or discharge repulsion force during electrical discharge machining, moreover, the amount of the deflection may be regarded as the displacement amount. The displacement is in a direction perpendicular to a line segment connecting the upper and lower wire guides.

In general, furthermore, the wire electrode diameter and the displacement amount of the wire electrode are set and input through an operation screen and stored in a storage device. While these elements are normally set and stored individually, they may alternatively be set and stored collectively as one data.

While the embodiments described above are related to a positioning operation for the wire electrode, the width dimension and inner diameter dimension of the workpiece can also be measured by using this positioning operation.

While embodiments of the present invention have been described herein, the invention is not limited to the above-described embodiments and may be suitably modified and embodied in various forms.

The invention claimed is:

1. A wire electrical discharge machine having functions of relatively moving an object and a wire electrode supported by upper and lower wire guides and positioning the wire electrode or measuring the shape of the object based on a contact/non-contact state of the wire electrode and the object, the wire electrical discharge machine comprising:

a voltage applying unit configured to apply a detection voltage for detecting the contact/non-contact state of the wire electrode and the object between the wire electrode and the object;

a relative movement unit for relatively moving the wire electrode and the object;

a wire electrode position detecting unit for detecting a center position of the wire electrode;

a contact state detecting unit configured to detect the voltage between the wire electrode and the object in the course of relative movement of the wire electrode toward and away from the object by the relative movement unit and detect the contact/non-contact state of the wire electrode and the object based on the detected voltage;

a wire electrode diameter storage unit for storing the diameter of the wire electrode;

a wire electrode displacement amount storage unit for storing an amount of displacement such that the wire electrode is displaceable between the upper and lower wire guides in a direction perpendicular to a line segment connecting the upper and lower wire guides;

an end face determination position detecting unit configured to detect an end face determination position in which the wire electrode is determined to be in contact with an end face of the object, based on the contact/non-contact state detected by the contact state detecting unit and the position of the wire electrode detected by the wire electrode position detecting unit;

a set number of times executing unit configured to execute a set number of times a contact detection movement where the relative movement unit moves the wire electrode and the object in the direction in which the wire electrode and an end surface of the object come into contact with each other with the movement speed slowing down and a non-contact detection movement where the relative movement unit moves the wire electrode and the object in the direction in which the wire electrode and the object come out of contact with each other with the movement speed increasing in order to shorten the detection time of the end surface determination position; and an end face determination position compensation unit configured to obtain an average value of the end surface determination position at the time of the contact detection movement, which has been detected by the end surface determination position detection unit after the set number of times execution unit has executed the contact detection movements and the non-contact detection movements, and then obtain the end face determination position from the thus obtained average value by compensation using a compensation value obtained from the wire electrode diameter and the displacement amount, wherein the wire electrical discharge machine positions the wire electrode or measures the shape of the object based on the position obtained by the end face determination position compensation unit as a position of the object.

2. The wire electrical discharge machine according to claim 1, wherein the wire electrode displacement amount is a clearance of the wire guides, an amplitude of the wire electrode, or an amount of deflection of the wire electrode.

3. A wire electrical discharge machine having functions of relatively moving an object and a wire electrode supported by upper and lower wire guides and positioning the wire electrode or measuring the shape of the object based on a contact/non-contact state of the wire electrode and the object, the wire electrical discharge machine comprising:

a voltage applying unit configured to apply a detection voltage for detecting the contact/non-contact state of the wire electrode and the object between the wire electrode and the object;

a relative movement unit for relatively moving the wire electrode and the object;

a wire electrode position detecting unit for detecting a center position of the wire electrode;

a contact state detecting unit configured to detect the voltage between the wire electrode and the object in the course of relative movement of the wire electrode toward and away from the object by the relative movement unit and detect the contact/non-contact state of the wire electrode and the object based on the detected voltage;

a wire electrode diameter storage unit for storing the diameter of the wire electrode;

a wire electrode displacement amount storage unit for storing an amount of displacement such that the wire electrode is displaceable between the upper and lower wire guides in a direction perpendicular to a line segment connecting the upper and lower wire guides;

an end face determination position detecting unit configured to detect an end face determination position in which the wire electrode is determined to be in contact with an end face of the object, based on the contact/non-contact state detected by the contact state detecting unit and the position of the wire electrode detected by the wire electrode position detecting unit;

a set number of times executing unit configured to execute a set number of times a contact detection movement where the relative movement unit moves the wire electrode and the object in the direction in which the wire electrode and the object come into contact with each other with the movement speed increasing in order to shorten the detection time of the end surface determination position and a non-contact detection movement where the relative movement unit moves the wire electrode and the object in the direction in which the wire electrode and the end surface of the object come out of contact with each other with the movement speed slowing down during the detection of the contact; and an end face determination position compensation unit configured to obtain an average value of the end surface determination position at the time of the non-contact detection movement, which has been detected by the end surface determination position detection unit after the set number of times execution unit has executed the contact detection movements and the non-contact detection movements, and then obtain the end face determination position from the thus obtained average value by compensation using a compensation value obtained from the wire electrode diameter and the displacement amount, wherein the wire electrical discharge machine positions the wire electrode or measures the shape of the object based on the position obtained by the end face determination position compensation unit as a position of the object.

4. The wire electrical discharge machine according to claim 3, wherein the wire electrode displacement amount is a clearance of the wire guides, an amplitude of the wire electrode, or an amount of deflection of the wire electrode.

* * * * *